United States Patent
Gardner et al.

(10) Patent No.: US 7,325,838 B2
(45) Date of Patent: Feb. 5, 2008

(54) ONE-PIECE LIQUID-TIGHT CONNECTOR

(75) Inventors: Michael J. Gardner, Hudson, OH (US); Robert R. White, deceased, late of Salem, OH (US); by Bettie J White, legal representative, Salem, OH (US)

(73) Assignee: Halex/Scott Fetzer Company, Bedford Heights, OH (US)

( * ) Notice: Subject to any disclaimer, the term of this patent is extended or adjusted under 35 U.S.C. 154(b) by 0 days.

(21) Appl. No.: 11/613,320

(22) Filed: Dec. 20, 2006

(65) Prior Publication Data

US 2007/0090642 A1    Apr. 26, 2007

Related U.S. Application Data

(63) Continuation of application No. 10/971,290, filed on Oct. 22, 2004, now abandoned.

(51) Int. Cl.
*F16L 11/118* (2006.01)
(52) U.S. Cl. ............... 285/154.4; 285/179; 285/331; 285/154.3; 285/151.1; 285/140.1
(58) Field of Classification Search ............ 174/44, 174/481, 59, 64, 653, 655, 657, 644; 285/179, 285/331, 149.4, 154.1, 154.2, 154.3, 154.4, 285/140.1, 139.1, 139.2, 139.3
See application file for complete search history.

(56) References Cited

U.S. PATENT DOCUMENTS

| | | | |
|---|---|---|---|
| 1,138,074 A | | 5/1915 | Bonnell |
| 1,255,417 A | * | 2/1918 | Hedges .............. 285/154.4 |
| 1,491,873 A | | 4/1924 | McMurtrie |
| 1,888,546 A | | 11/1932 | Anderson |
| 1,901,897 A | | 3/1933 | Clayton |
| 2,220,874 A | | 5/1940 | Dann |
| 2,967,722 A | | 1/1961 | Lifka |
| 3,262,188 A | | 7/1966 | Briegel et al. |
| 4,103,101 A | | 7/1978 | Maier |
| 4,730,855 A | | 3/1988 | Pelletier |
| 6,044,868 A | | 4/2000 | Gretz et al. |
| 6,248,952 B1 | | 6/2001 | Reeves et al. |
| 6,460,638 B1 | | 10/2002 | Strunsee et al. |
| 6,585,297 B2 | | 7/2003 | Mullen, Jr. |
| 6,616,194 B1 | | 9/2003 | Gretz |
| 6,637,777 B2 | | 10/2003 | Zimmerman et al. |

* cited by examiner

*Primary Examiner*—Aaron Dunwoody
(74) *Attorney, Agent, or Firm*—Pearne & Gordon LLP

(57) ABSTRACT

A liquid-tight electrical connector formed by a one-piece, zinc die cast member including a ferrule insertable into a conduit, and a sleeve body surrounding the ferrule to form a conduit receiving channel, the sleeve body having a strap section that can be drawn tight around a conduit to secure it in the channel.

7 Claims, 4 Drawing Sheets

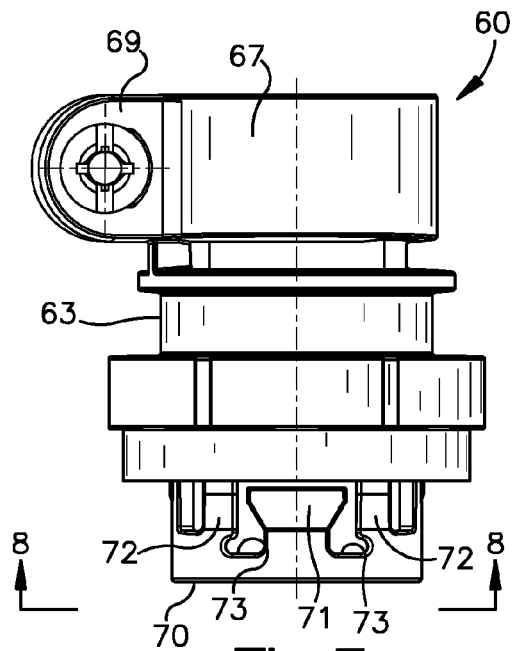
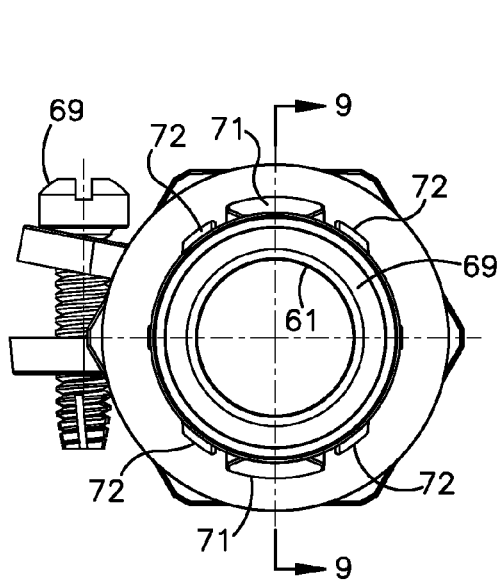
Fig. 7
Fig. 8
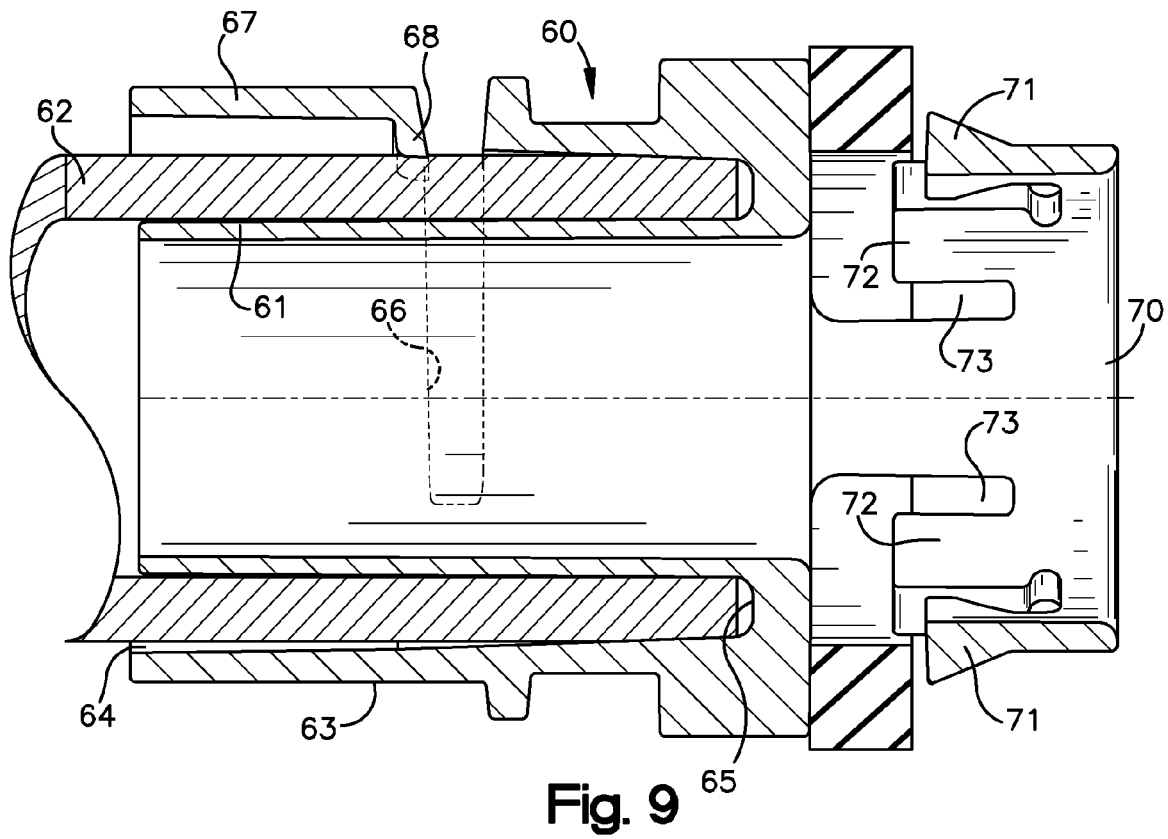
Fig. 9

ONE-PIECE LIQUID-TIGHT CONNECTOR

CROSS REFERENCE TO RELATED APPLICATION

The present application is a continuation of U.S. patent application Ser. No. 10/971,290 filed Oct. 22, 2004, now abandoned, which is incorporated herein by reference in its entirety.

FIELD OF THE INVENTION

The present invention relates generally to electrical connectors, and more specifically to liquid-tight electrical connectors for securing flexible metallic and non-metallic liquid-tight conduit to various devices, such as metal outlet boxes, conduit bodies and the like.

BACKGROUND OF THE INVENTION

Flexible liquid-tight metal conduit consists of a plastic jacket and an inner steel sleeve. In use, it is necessary to maintain a low resistance ground path. It is also necessary to maintain the ground, i.e. avoid a short circuit, at high current levels occurring over short intervals. Flexible, non-metallic, liquid-tight conduit is typically an extruded plastic tube.

Typical liquid-tight connectors have several components which must be carefully assembled to affect the desired connection. One such assembly includes a compression nut, a bushing, a ferrule, and a body member or bushing having exterior threads. The assembly operation is carried out in the field and involves the steps of telescoping the compression nut over the end of the conduit, placing the bushing over the end of the conduit, inserting the ferrule into the conduit, sliding the nut and bushing toward the end of the conduit, and then threading or tightening the compression nut onto the body. The assembly procedure is time consuming and must be carried out with care to avoid misalignment of the various parts and consequent leakage.

Another multi-part prior art liquid-tight connector is disclosed in U.S. Pat. No. 6,616,194. The preferred embodiment disclosed in this patent includes a body member or bushing having an integral, rearwardly extending ferrule. A separate sleeve surrounds the ferrule in spaced relation to form a conduit-receiving channel. The sleeve has inwardly bent tangs that bite into the conduit in order to inhibit withdrawal of the conduit. The sleeve is surrounded and held in place by a third cylindrical member or cover that is threaded onto the bushing. All three members require an assembly operation. The forward end of the bushing or body has a threaded neck that receives a washer and snap ring so that the entire connector consists of five separate pieces.

U.S. Pat. No. 6,044,868 discloses a plastic fitting or connector that is specifically designed for use with non-metallic, liquid-tight conduit. The connector is neither intended nor capable of being used with liquid-tight metallic conduit which requires an electrical ground.

SUMMARY OF THE INVENTION

An object of the present invention is to provide a one-piece liquid-tight connector that will accept both metallic and non-metallic liquid-tight conduit.

An object of the present invention is to provide a one-piece, liquid-tight connector for both metallic and non-metallic liquid-tight conduit that avoids the assembly problems associated with the prior art multiple part connectors.

Another object of the invention is to provide a one-piece, liquid-tight connector member having a construction that permits full and proper insertion of both metallic and non-metallic liquid-tight conduit, and provides a strong grip around the conduit to prevent its withdrawal, thereby assuring a reliable, liquid-tight connection.

A further object of the invention is to provide a one-piece liquid-tight connector member having the advantages described above that can be made as a one-piece zinc die casting that assures a low resistance ground path when used with metallic, liquid-tight conduit, and which will also accept non-metallic liquid-tight conduit.

In accordance with a disclosed embodiment of the invention, the new and improved one-piece liquid-tight connector comprises a tubular ferrule having a free end and fixed end, a sleeve body surrounding the ferrule in spaced relationship to form a channel for securing both metallic and non-metallic, liquid-tight conduit, the sleeve body having one end joined to the fixed end of the ferrule to form a closed end for the channel and an opposite end portion adjacent the free end of the ferrule forming an open end for the channel, the channel being tapered toward the closed end in order to compress non-metallic conduit and the jacket of metallic, liquid-tight conduit, thereby providing exceptional sealing capacity. The sleeve body has a flexible strap section extending partially around the ferrule, the strap section being formed by a semi-circular slot in the sleeve body and having a fixed end and a free end that can be drawn toward an adjacent edge of the sleeve body to clamp a conduit in the channel. The strap section may include a radially inwardly extending rib around at least a portion of its inner wall, the rib being engageable with the conduit.

The connector may be a one-piece, zinc die cast body. The die cast body assures a low resistance ground path when used with metallic liquid-tight conduit and connected to an outlet box, metal panel, etc.

In one embodiment, the connector member has a tubular nose that is coaxial with and extends away from the ferrule. A liquid-tight gasket and a lock nut are engaged on the threaded nose for securing the connector member to an outlet box, a conduit body or other enclosure. In another embodiment, the one-piece connector member includes an integral elbow that forms a continuation of and extends away from the ferrule. The elbow may have a threaded end on which is mounted a lock nut and gasket.

In still other embodiments of the invention, the threaded end of the nose or elbow is replaced by a snap-in finger structure such as disclosed in U.S. patent application Ser. No. 10/669,489, filed Sep. 23, 2003, the disclosure of which is incorporated herein by reference.

The unique one-piece construction that includes a flexible strap section that can be tightened around the conduit inserted in the conduit-receiving channel assures a firm connection that prevents inadvertent withdrawal of the conduit from the connector. The channel itself has no obstructions along its length, such as inwardly extending tangs, etc., whereby the conduit can be fully and correctly inserted even though the conduit may have burrs on its end as a result of being cut.

Other advantages and a fuller understanding of the invention will be had from the following detailed description and the accompanying drawings.

BRIEF DESCRIPTION OF THE DRAWINGS

FIG. 7 is an elevational view of another embodiment of the invention;

FIG. 8 is an end elevational view taken in the plane of the line 8-8 of FIG. 7;

FIG. 9 is an enlarged, cross-sectional view taken on the line 9-9 of FIG. 8;

DESCRIPTION OF PREFERRED EMBODIMENTS

Figure 1:
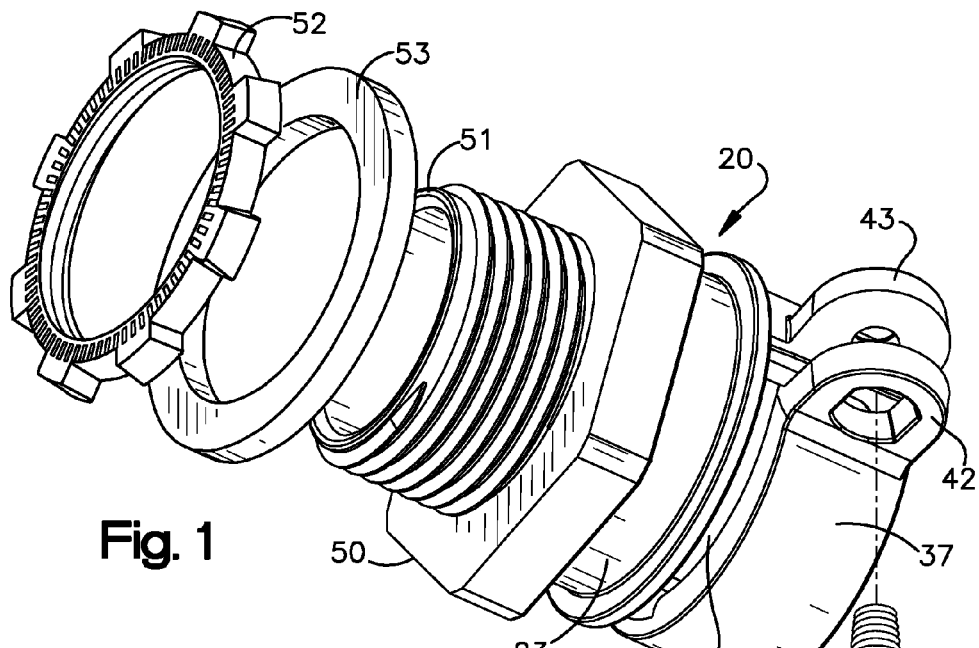
FIG. 1 is an exploded, perspective view of one embodiment of the invention.
Figure 2:
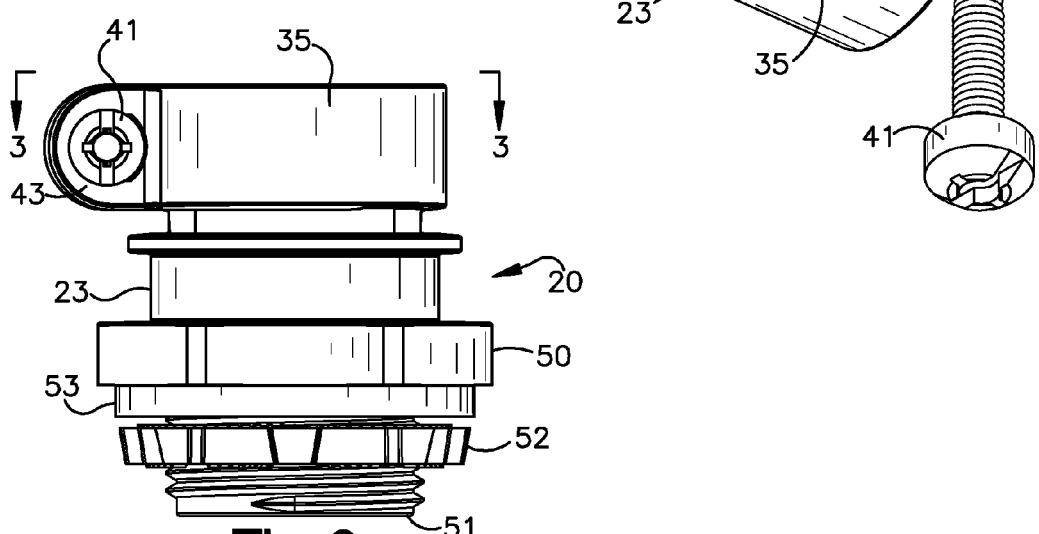
FIG. 2 is an elevational view of the assemblies embodiment of FIG. 1.
Figure 3:
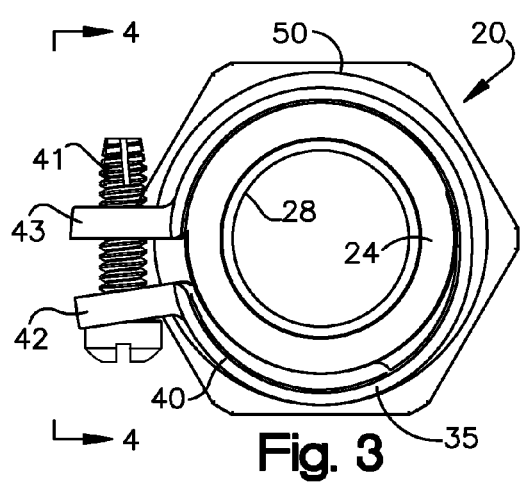
FIG. 3 is an end elevational view taken in the plane of the line 3-3 of FIG. 2.
Figure 4:
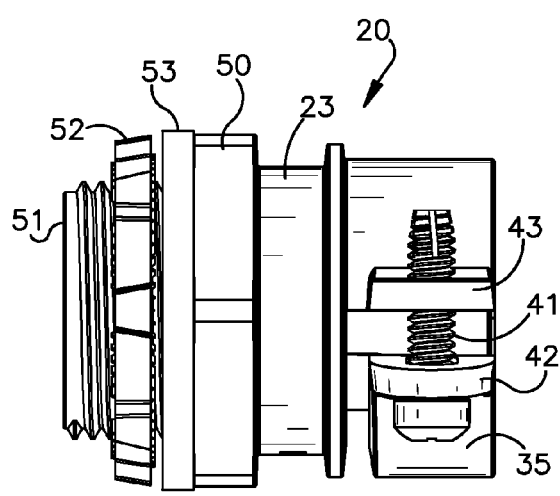
FIG. 4 is a side elevational view taken in the plane of line 4-4 of FIG. 3.
Figure 5:
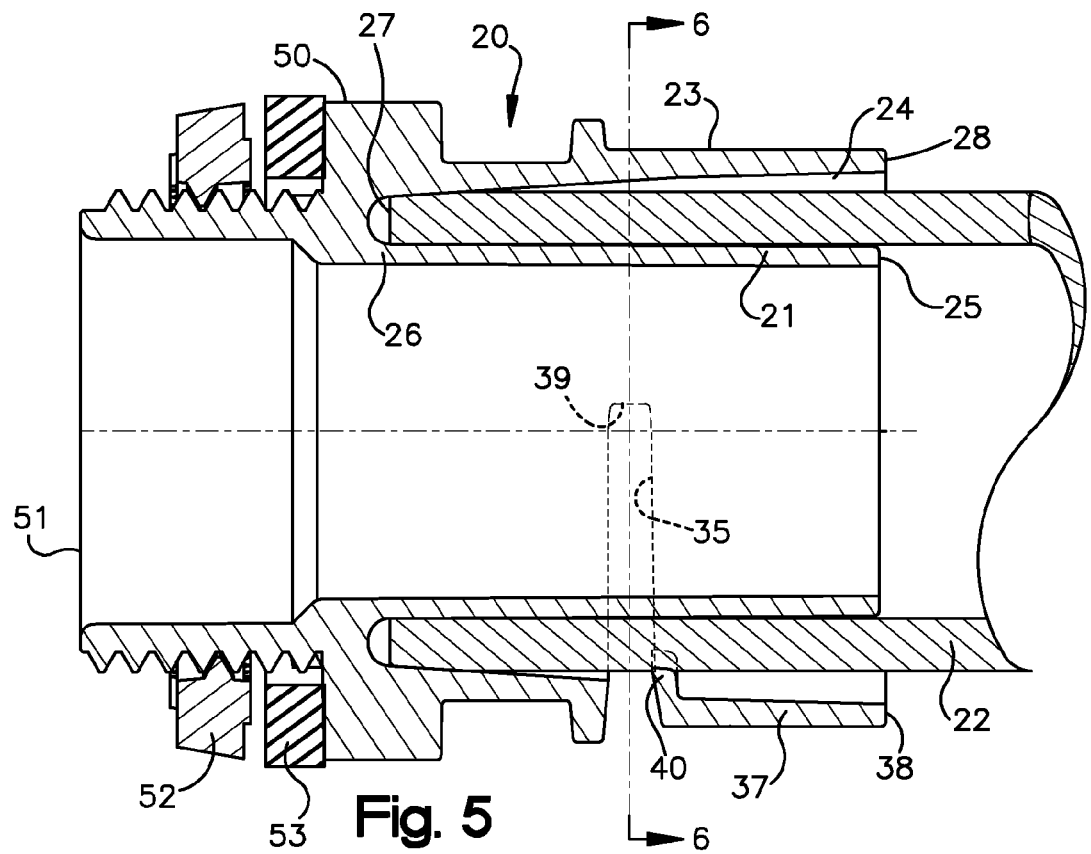
FIG. 5 is an enlarged, cross-sectional view of the embodiment of FIGS. 1-4 showing the end of a conduit inserted into the one-piece member.
Figure 6:
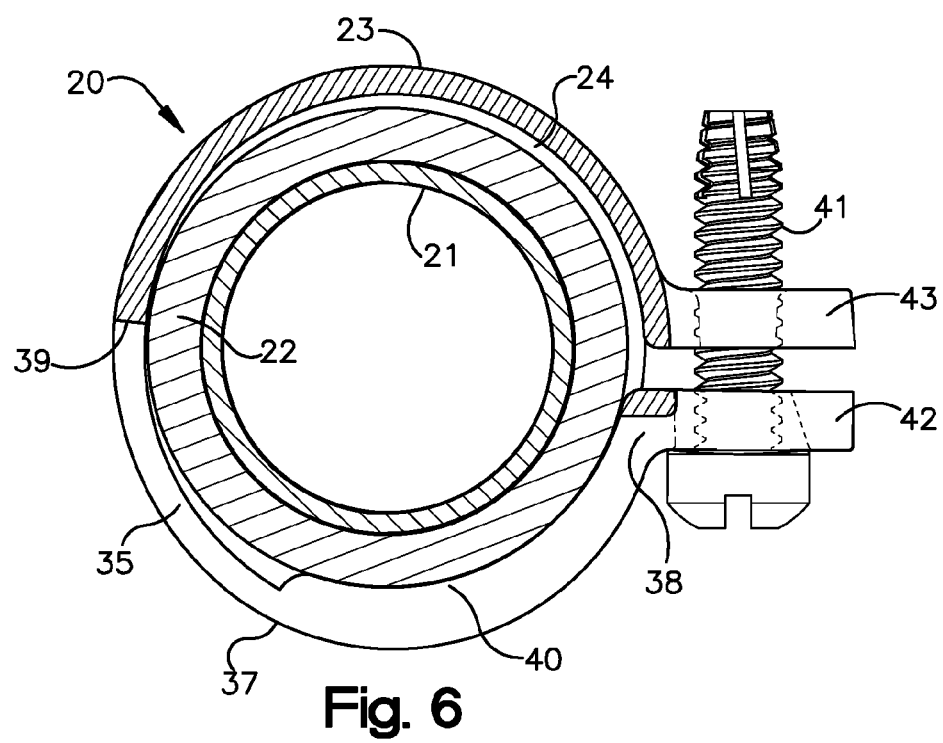
FIG. 6 is a cross-sectional view taken along the line 6-6 of FIG. 5.

Referring now to the drawings, FIGS. 1-6 show a zinc die cast, one-piece liquid-tight connector member 20 constructed in accordance with the present invention. The one-piece member 20 includes a tubular ferrule 21 that is insertable into the end of a conduit 22 as shown in FIGS. 5 and 6, and a surrounding sleeve body 23 that is radially spaced from the ferrule 21 so as to define a conduit receiving channel 24. The illustrated conduit 22 is intended to represent both metallic and non-metallic liquid-tight conduit.

The ferrule 21 has a free end 25 and a fixed end 26 that is joined to the sleeve body 23 to form a closed end 27 of the channel 24. The free end 25 of the ferrule 21 is radially spaced from the free end portion 28 of the sleeve body 23 so as to define an open end of the channel 24. As shown most clearly in FIG. 5, the walls of the channel 24 are tapered toward the closed end 27 in order to compress non-metallic conduit and the jacket of metallic conduit, thereby providing exceptional sealing capacity.

A semi-circular slot 35 is formed through the side wall of the sleeve body 23 between its ends. The slot 35, which is shown extending approximately half way around the sleeve body 23, forms the side of a flexible strap section 37 which has a free end 38 and a fixed end 39 integral with the sleeve body 23.

The strap section 37 of the sleeve body 23 can be tightened around a conduit 22 seated in the conduit receiving channel 24 as shown in FIGS. 5 and 6. To this end, the free end 38 of the strap section 37 and the adjacent part of the sleeve body 23 have confronting ears 42, 43, respectively. A threaded fastener 41 extends freely through a hole in the ear 42 and through a threaded opening in the ear 43. A radially inwardly extending rib 40 is formed part way around the inside of the strap section 37. When the strap section 37 is tightened, the rib 40 clamps down on the conduit 22 so that it is firmly gripped by the strap section, thereby providing excellent retention against axial pullout of the conduit.

The one-piece member 20 has an external collar or flange 50. In the embodiment of FIGS. 1-6, a threaded nose 51 forming the leading end of the member 20 extends away from the flange 50 in a direction opposite to the ferrule 21. A lock nut 52 is threaded on the nose 51 and a liquid tight washer 53 is located between the lock nut 52 and the flange 50.

In use, the conduit 22 is inserted through the open end of the conduit receiving channel 24 and is wedged against the tapered walls at the closed end 27 of the channel. The seating of the conduit 22 between the tapered walls provides good sealing capacity. The screw 41 is inserted through the ear 42 and is threaded into the ear 43 to draw the ears together, whereby the conduit 22 is firmly clamped in the channel 24 by the strap section 37. The strap section 37 provides a strong and reliable, radially clamping action that prevents withdrawal of the conduit. Since the channel 24 is open from its open end to its closed end, the conduit can be inserted fully and correctly with minimum interference to assure a liquid-tight connection. When mounting the connector member 20 to the wall of an outlet box or the like, the nose 51 is inserted through the hole of the wall with the washer 53 against the outside face. The lock nut 52 is then threaded on the nose against the inside surface in the usual manner.

FIGS. 7-9 illustrate a modification of the invention in which the nose or leading end of the one-piece member is constructed as disclosed in the above-referenced application Ser. No. 10/669,489 to provide a quick connect, snap-in connection. The one-piece, zinc die cast member is generally designated by reference numeral 60. The trailing end of the member 60 is constructed in the same manner as described above in connection with FIGS. 1-6 and includes a tubular ferrule 61 that is insertable into the end of a conduit 62, a surrounding sleeve body 63 that is radially spaced from the ferrule 61 so as to define a conduit receiving channel 64 which has a fixed end joined to the sleeve body 63 to form a closed end 65 of the channel 64. A semi-circular slot 66 is formed through the side wall of the sleeve body 63 to form the sides of a flexible strap section 67 which has a radially inwardly extending rib 68 that bites into the conduit 62 when the strap section is tightened by the threaded fastener 69. The leading end or nose 70 of the one-piece member 60 has two locking fingers 71 spaced 180° apart and tensioning fingers 72 adjacent to and on each side of each locking finger 71. The fingers 71, 72 are separated by notches 73 in the end portion 70 of the member 60. In use, a snap-fit with a junction box or the like (not shown) causes the fingers 71, 72 to flex inwardly. The locking fingers 71 are pushed through the opening of the box wall and engage its inner surface to prevent the fitting from being withdrawn. At the same time, the tensioning fingers 72 engage the edge of the opening and serve to provide firm contact between the fitting 60 and the box, as well as keeping the fitting centered in the box opening.

Figures 10, 11:
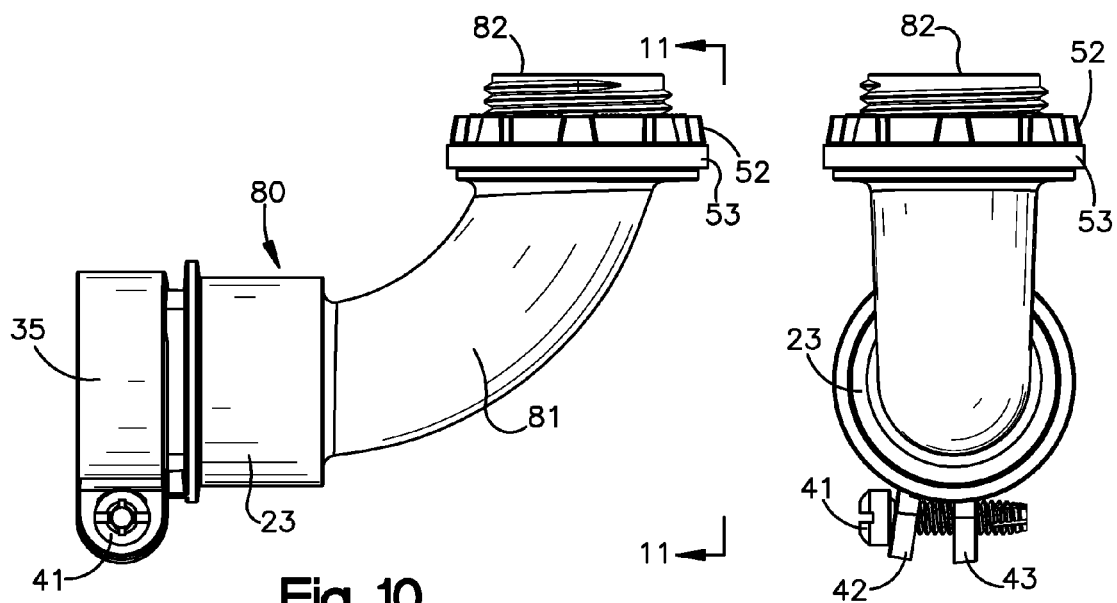
FIG. 10 is a side elevational view of the third embodiment of the invention.
FIG. 11 is an elevational view taken in the plane of the line 11-11 in FIG. 10.

FIGS. 10 and 11 illustrate a third embodiment 80 which is constructed in the same manner as member 20 described in connection with FIGS. 1-6 except that the member 80 includes an elbow 81 at the leading end of the member. In FIGS. 10 and 11, the parts corresponding to member 20 have the same reference numbers. The elbow 81 that extends from the leading end of the member 80 has a threaded free end 82. A locknut 52 and a gasket 53 are mounted on the threaded end portion 81.

Figures 12, 13:
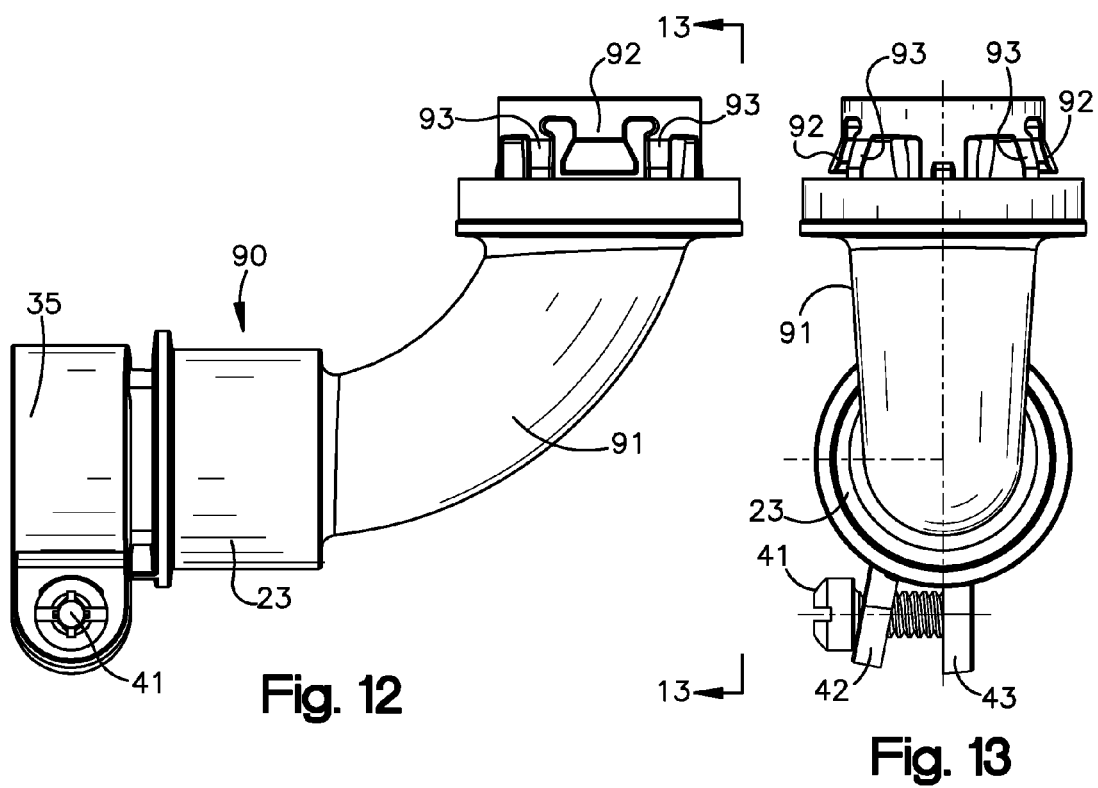
FIG. 12 is an elevational view of a fourth embodiment of the invention.
FIG. 13 is an elevational view taken in the plane of the line 13-13 of FIG. 13.

FIGS. 12 and 13 show still another embodiment of the invention which is similar to the embodiment of FIGS. 10 and 11 except that the end of the elbow is provided with quick connect, snap-in fingers as described above in connection with the embodiment of FIGS. 7-9. The one-piece member in FIGS. 12 and 13 is generally designated by reference number 90 and includes an elbow 91. The snap-in finger structure is the same as described above in connection with FIGS. 7-9 and includes locking fingers 92 and tensioning fingers 93 adjacent to and on each side of the locking fingers 92.

Many other modifications and variations of the invention will be apparent to those skilled in the art in light of the foregoing detailed disclosure. Therefore, it is to be understood, that within the scope of the appended claims, the invention can be practiced otherwise than specifically shown and described.

What is claimed is:

1. A one-piece liquid-tight connector member comprising:
a tubular ferrule having a free end and a fixed end,
a sleeve body surrounding said ferrule in spaced relationship to form a channel for securing both metallic and non-metallic, liquid-tight conduit, said sleeve body having one end joined to said fixed end of said ferrule to form a closed end for said channel and an opposite end portion adjacent said free end of said ferrule forming an open end for said channel, said channel being tapered toward said closed end in order to compress non-metallic conduit and metallic, liquid-tight conduit, thereby providing exceptional sealing capacity, said sleeve body having a flexible strap section extending partially around said ferrule, said strap section being formed by a semi-circular slot in said sleeve body and having a fixed end and a free end that can be drawn toward an adjacent edge of said sleeve body to clamp a conduit in said channel, said strap section including a radially inwardly extending rib, said rib being engageable with the conduit.

2. A one-piece liquid-tight connector member as claimed in claim 1 consisting of a zinc die-cast body, whereby a low resistance ground is established for metallic liquid-tight conduit when said connector member is connected to an outlet box.

3. A one-piece liquid-tight connector member as claimed in claim 2 including confronting ears on said free end of said strap section and an adjacent edge of said sleeve body, and a threaded member engaged through said ears for drawing them together.

4. A one-piece liquid-tight connector member as claimed in claim 3 including a leading end extending away from said sleeve body in a direction opposite to said ferrule.

5. A one-piece liquid-tight connector member as claimed in claim 4 wherein said leading end has two locking fingers spaced 180° apart and tensioning fingers adjacent to and on each side of said locking fingers, said locking fingers and tensioning fingers being separated by notches.

6. A one-piece liquid-tight connector member as claimed in claim 5 wherein said leading end comprises a tubular nose coaxial with said ferrule and extending from said sleeve body.

7. A one-piece liquid-tight connector member as claimed in claim 5 wherein said leading end comprises an elbow extending from said sleeve body.

* * * * *